United States Patent [19]

Pinney

[11] Patent Number: 4,989,489
[45] Date of Patent: Feb. 5, 1991

[54] BRUSH CUTTING BLADE

[76] Inventor: J. Dana Pinney, 9130 SW. Apache Dr., Tualatin, Oreg. 97062

[21] Appl. No.: 370,697

[22] Filed: Jun. 23, 1989

Related U.S. Application Data

[63] Continuation-in-part of Ser. No. 335,423, Apr. 10, 1989, Pat. No. 4,922,791, which is a continuation of Ser. No. 124,673, Nov. 24, 1987, Pat. No. 4,881,438, which is a continuation-in-part of Ser. No. 929,636, Nov. 12, 1986, abandoned, which is a continuation-in-part of Ser. No. 754,761, Jul. 15, 1985, abandoned.

[51] Int. Cl.⁵ .............................................. B27B 33/12
[52] U.S. Cl. ....................................... 83/840; 83/844; 83/848
[58] Field of Search ................ 83/835, 837, 839, 844, 83/848, 834, 833, 840, 841, 846

[56] References Cited

U.S. PATENT DOCUMENTS

| | | |
|---|---|---|
| 869,574 | 10/1907 | Huther . |
| 1,334,633 | 3/1920 | Pioche .................................. 83/848 |
| 1,988,898 | 1/1935 | Hafner . |
| 2,508,784 | 5/1950 | Cox . |
| 2,622,636 | 12/1952 | Cox . |
| 2,958,348 | 11/1960 | Bueneman . |
| 2,992,664 | 7/1961 | De Shano . |
| 3,144,891 | 8/1964 | Carlton . |
| 3,344,822 | 10/1967 | Wilder ................................ 83/837 |
| 3,425,467 | 2/1969 | Willis . |
| 4,563,929 | 1/1986 | Ringlee et al. ..................... 83/840 |
| 4,627,322 | 12/1986 | Hayhurst, Jr. ..................... 83/831 |
| 4,744,148 | 5/1988 | Brown ............................. 83/839 X |
| 4,782,731 | 11/1988 | Huntington ........................ 83/837 |
| 4,813,325 | 3/1989 | Gelman ............................. 83/844 |
| 4,881,438 | 11/1989 | Pinney .............................. 83/840 |

FOREIGN PATENT DOCUMENTS

| | | |
|---|---|---|
| 3539334 | 7/1987 | Fed. Rep. of Germany ........ 83/834 |
| 1194641 | 5/1959 | France . |
| 80528 | 11/1931 | Sweden . |

Primary Examiner—Hien H. Phan
Assistant Examiner—Eugenia A. Jones
Attorney, Agent, or Firm—Klarquist, Sparkman, Campbell, Leigh & Whinston

[57] ABSTRACT

Circular brush cutting blade for powered brush cutter has cutting teeth arranged in pairs on periphery of blade, the teeth in pairs being of alternate right and left configuration and closely spaced together, the pairs of teeth being relatively widely spaced apart on the blade. Means are provided to engage the kerf sides and deflect the blade toward its central plane as it engages the material being cut.

23 Claims, 3 Drawing Sheets

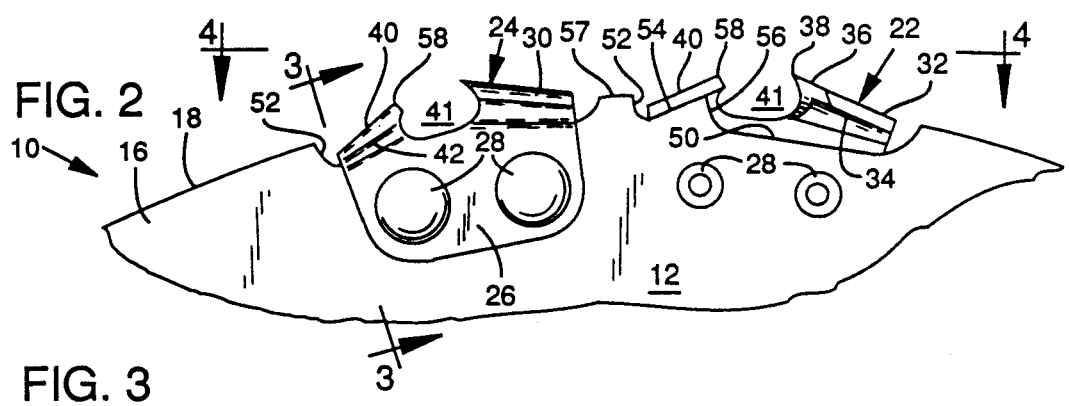
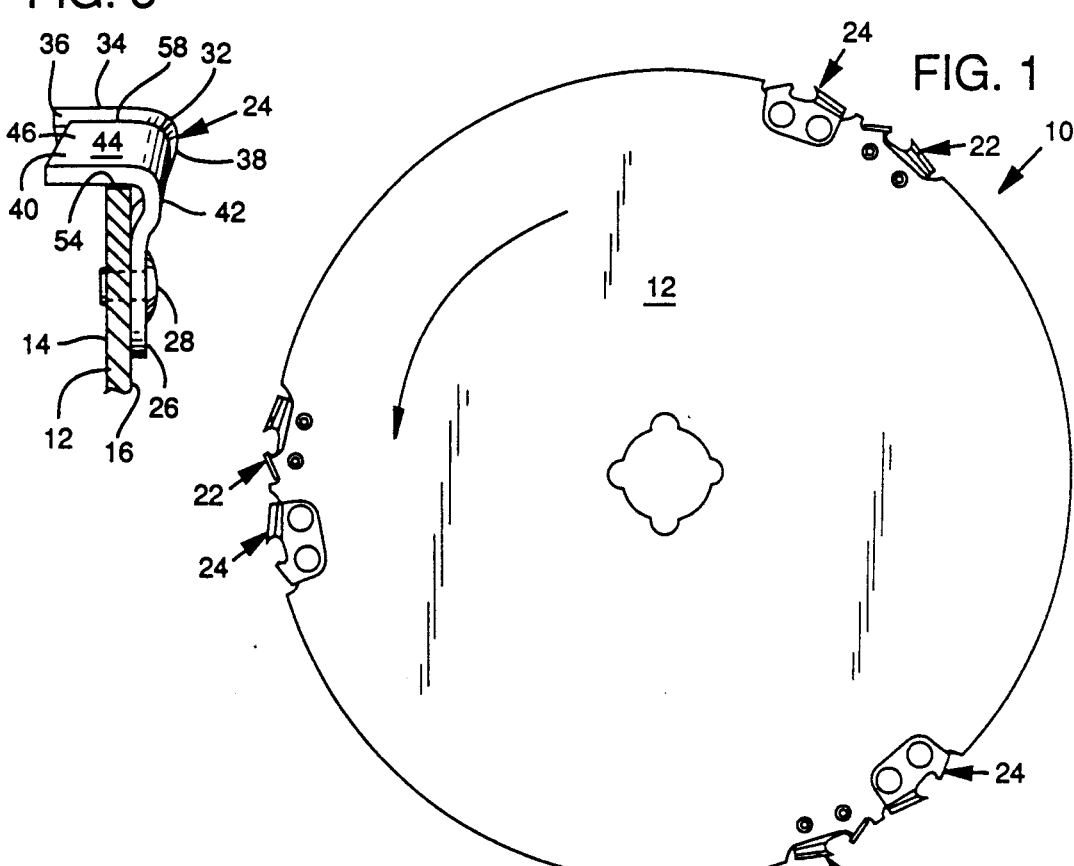
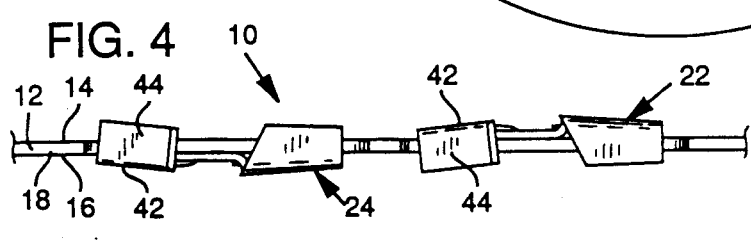

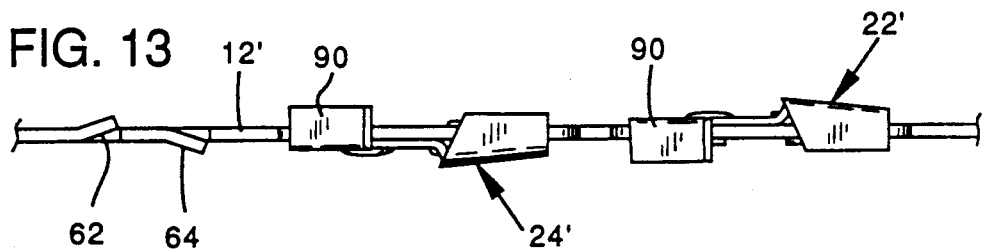
FIG. 13
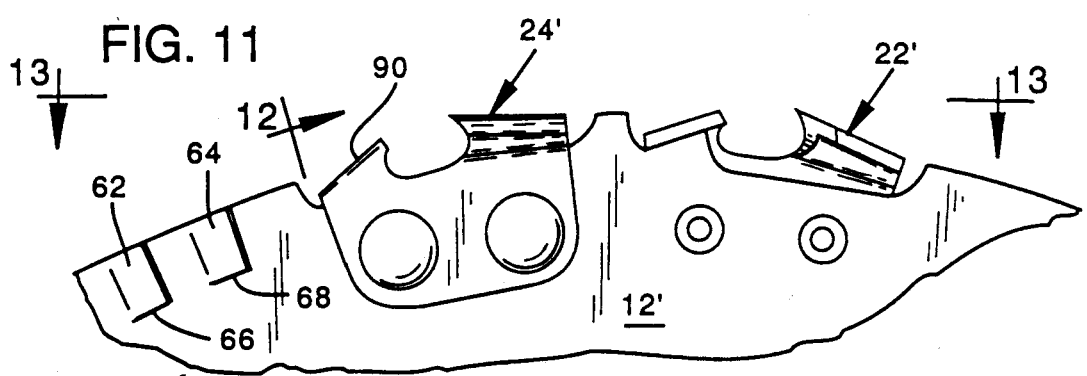
FIG. 11
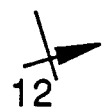
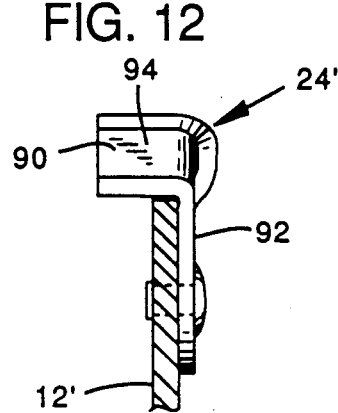
FIG. 12

1

BRUSH CUTTING BLADE

The present application is a continuation-in-part of my prior application Ser. No. 07/335,423, filed Apr. 10, 1989, now U.S. Pat. No. 4,922,791, which was a continuation of application Ser. No. 07/124,673, filed Nov. 24, 1987, now U.S. Pat. No. 4,881,438, which was a continuation-in-part of application Ser. No. 06/929,636, filed Nov. 12, 1986, now abandoned, which was a continuation-in-part of application Ser. No. 754,761, field July 15, 1985, now abandoned.

The present invention relates to a cutter blade for cutting brush, small trees and like and, more particularly, to a new and improved arrangement of cutting teeth in such a blade.

BACKGROUND OF THE INVENTION

Circular blades driven by a motor, electric or gas powered, have been used for a number of years for cutting brush and small trees. Such blades are generally mounted on the end of a manually supported arm with the blade rotating in a substantially horizontal plane to cut upright brush and small trees, although the blade can cut in any position. Some prior blades were formed with offset teeth formed in the blade much like a handsaw. Such blades are inefficient and slow cutting.

Circular blades for various purposes have been provided with teeth such as are used in cutting chains for chain saws secured thereto in evenly spaced relation. Blades of this type are shown in U.S. Pats. Nos. 859,554; 1,988,898; 2,992,664; and 3,425,467; Swedish Patent No. 80,528; and French Patent No. 1,194,641. Other blades had lengths of saw chain secured to their periphery, e.g. U.S. Pat. Nos. 2,958,348; 4,563,929; and 4,627,322. A common problem with such blades was their tendency occasionally to "kick back," that is, to give a sudden, forceful and uncontrolled reaction that caused the blade and supporting elements to move suddenly away from the piece being cut. Such "kick backs" have been a source of many injuries. An improved form of such a blade is shown in my co-pending application, Ser. No. 07/124,673, filed Nov. 24, 1987. This blade is characterized by having a plurality of saw chain teeth equally spaced about the periphery of the blade, each of the teeth being formed with a wide ramp or depth gauge preceding the cutting edge. Such blades had much reduced kick back as compared to prior blades and are substantially safer in use. Nonetheless, it is desirable that a brush cutting blade evidence as little kick back force as possible to negate the possibility of an injury producing reaction.

SUMMARY OF THE INVENTION

It is an object of the present invention to provide an improved circular brush cutting blade.

More particularly, it is an object to provide a circular brush cutting blade with substantially negligible kick back reaction.

Another object is to provide a brush cutting blade with substantially less kick back than prior blades, but with improved cutting efficiency.

Other objects and advantages will become more apparent hereinafter.

In accordance with the illustrated embodiments of the invention, the foregoing objects are achieved by providing a brush cutting blade comprising a circular disc having several pairs of cutting elements mounted thereon, the cutting elements comprising cutting edges extending transversely of the disc, the pairs being of right and left hand configuration. The cutting elements of each pair are spaced closely together circumferentially, whereas the pairs of cutter elements are widely spaced from each other. Such a blade cuts with a high degree of efficiency, but exhibits little tendency to kick back.

DRAWINGS

FIG. 1 is a side elevation of a preferred form of cutter blade made in accordance with the invention;

FIG. 2 is an enlarged side elevation of a portion of the blade of FIG. 1;

FIG. 3 is a sectional view taken along line 3—3 of FIG. 2;

FIG. 4 is a top view looking in direction of arrows 4—4 of FIG. 2;

FIG. 11 is a side elevation of a portion of a blade and a pair of cutters showing a modified form of the invention;

FIG. 12 is a sectional view taken along line 12—12 of FIG. 11; and

FIG. 13 is a top view looking in the direction of the arrows 13—13 of FIG. 11;

DETAIL DESCRIPTION OF THE INVENTION

Figure 5:
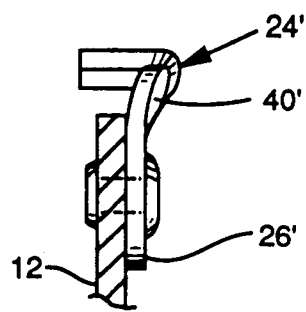
FIG. 5 is a front view of a modified cutter mounted on a blade.

With reference first to FIGS. 1-4, the preferred form of cutter blade 10, made in accordance with the invention, comprises a circular disc 12 having opposite planar sides 14, 16 and a smooth, generally continuous periphery 18. Attached to the disc 12 adjacent its periphery are a plurality of right hand cutter teeth 22 and alternating left hand cutter teeth 24. The cutter teeth are mounted in pairs, each pair constituting one right hand and one left hand cutter. The cutters in each pair are relatively closely spaced circumferentially, but the pairs are relatively widely spaced apart. More will be said of the spacing subsequently.

The cutter teeth 22, 24 are substantially identical. other than being opposite hand, and in numerous respects, particularly in the cutter configuration, resemble teeth commonly used in saw chain. Because of this identity, only a left hand tooth 24 will be described in detail. The cutter tooth 24 comprises a flat plate portion 26 which abuts the left disc side surface 16, the tooth being rigidly secured to the disc by suitable fastener means, such as rivets 28. The tooth 24 is formed with a single cutter element 30 consisting of a kerf side wall cutting portion 32 and a kerf bottom cutting or flange portion 34. As best shown in FIG. 3, the side wall cutting portion 32 is laterally offset from the plate portion 26, the offset decreasing from the forward to the rearward end thereof to provide clearance for the following portions of the tooth. The flange portion 34 extends from the side wall cutting portion 32 substantially at a right angle to the disc side surfaces 14, 16 so as to extend beyond the right disc side surface 14. The forward edge of the side wall portion 32 and flange 34 is formed with a beveled surface 36 defining a continuous cutting edge 38.

Each cutter tooth 24 is provided with a ramp or depth gauge 40 integral with the forward end of the plate portion 26 and positioned forwardly of the cutter element 30 to define a gullet 42 between the cutter element and depth gauge 40. The depth gauge 40 comprises a shank portion 42 and top plate portion 44 which extends across the blade from said shank portion substantially perpendicularly to the blade side surface. The top plate portion 44 defines an upwardly facing flat surface 46 which slopes upwardly from its forward edge toward the cutting edge 38.

While the illustrated tooth is of so-called chipper tooth design, such as shown in U.S. Pat. No. 2,508,784, such a tooth having a rounded side wall kerf cutting portion 32, the configuration of the sidewall cutting portion is not critical and other commonly used configurations could be used so long as the tooth top plate or flange portion 44 forms a kerf bottom cutting element. For example, the tooth could be of chisel bit design as shown in U.S. Pat. No. 2,622,634 or semichisel design as shown in U.S. Pat. No. 3,144,891 or any of the other commonly used saw chain tooth configurations.

Referring more particularly to FIG. 2, the periphery of the disc 12 is formed with a cutaway 50 opposite each tooth so that the teeth may be mounted on the disc with certain portions of the teeth recessed below the periphery of the disc. Thus, the right hand tooth 22 is mounted opposite a cutaway 50 including a forward portion 52 receiving the depth gauge top plate 44, the forward portion 52 being shaped so that the bottom surface of the depth gauge top plate engages a cooperatively inclined surface 54 which supports the depth gauge. The cutaway 50 includes a rear portion 56 opposite the tooth gullet 42 and cutter 30, the portion 56 being sufficiently deep that the tooth cutting edge 38 may be sharpened with a file or grinding element extending across the tooth and blade. The rear cutaway portion 56 preferably extends beyond the rearmost portion of the tooth flange 34 so as to provide clearance for wood chips cut by the cutting edge 38.

The teeth 22, 24 are each mounted to the blade preferably so that the depth gauge surface 46 slopes upwardly at an angle of between twenty-five and thirty-five degrees with respect to a plane parallel to the axis of the disc and normal to a radius of the disc intersecting the trailing edge 58 of the depth gauge top plate 44, and with said trailing edge positioned above the arc of the blade periphery 18 between about 0.025 and 0.035 inch. As shown in FIG. 2, the depth gauge is positioned on the blade such that the arc of the blade periphery 18 intersects the depth gauge surface 46.

The flange portion 34 of a tooth inclines downwardly at a small acute angle, preferably between about seven and ten degrees, with respect to a perpendicular to a radius of said disc intersecting the forward edge of the flange portion, the cutting edge of the flange portion 60 projecting beyond the arc of the disc periphery 18 by between about 0.020 and 0.045 inch beyond the depth gauge projection. The tooth is preferably mounted so that the trailing edge of the top surface of the flange portion 44 is flush with the arc of the disc periphery 18.

The foregoing arrangement of clearance of the cutting edge of the flange portion 34 and the depth gauge allows a tooth to be sharpened repeatedly, at each sharpening lowering the depth gauge by the same amount as the cutting edge on the flange portion 34 is lowered by filing down the depth gauge at its trailing edge 58 in the customary manner of sharpening a saw chain tooth to maintain the desired cutting edge edge 58 in the customary manner of sharpening a saw chain tooth to maintain the desired cutting edge clearance, until the depth gauge has been lowered to the point where its top surface is flush with the arc of the blade periphery 18. At this point the cutting edge 38 will have a clearance of at least 0.020 inch above the periphery of the blade 18 which will permit it to cut material effectively.

The purpose of providing the teeth in pairs of right and left configuration with the substantial spacing between the pairs is to provide smoothness in the cutting operation, reduce the drag imposed upon the saw blade as it progresses through the wood, reduce kick back, and improve the blade cutting efficiency.

When the teeth are evenly and relatively closely spaced around the edge of a blade as has been the practice in the past, there is not enough space between teeth to permit the smaller engines to recover engine speed after it slows during the progress of a tooth through the brush that is being cut. Thus, the engines labor. Spacing separate cutters widely also provides either a hard left or a hard right pull on the individual cutters, thus deflecting the blade so that the blade is out of a centered position for the following cutter. This creates a vibration or "chatter" that can be detected by the operator, and can cause a blade to wander, increasing kerf width and decreasing the blade's efficiency. However, when the teeth are in pairs, there is an almost instant left-right pull on the blade, minimizing its deflection and leaving the blade in a relatively balanced position for the next set of cutters. As a result, a blade with widely spaced pairs of cutter teeth operates move smoothly and efficiently.

Traditional blade technology was to provide a blade so that there was at least one and preferably two teeth in a cut at all times. I have found that providing a blade having teeth in widely spaced apart pairs, there are brief periods with no teeth in the cut. The pause period provided between the cuts enables the small, high speed motors used with brush cutters to recover their lost speed and the motors operate more smoothly and efficiently. The space between teeth pairs needs to be longer for smaller motors than for larger more powerful motors. For example, a 20 cc. gas engine would successfully operate a nine inch blade with three equidistantly spaced pairs of teeth, but would not operate well with a nine inch blade with four equidistantly spaced pairs of teeth. By contrast, a large gasoline engine of 64 cc. could successfully function in a brush cutter with a ten inch blade with six equidistantly spaced pairs of teeth. Thus, the optimum spacing between pairs of teeth will depend upon the horsepower of the engine propelling the blade and the blade diameter, but, in any case, the spacing between pairs should be several times the length of a tooth or the spacing between teeth. Ordinarily, saw chain teeth are of the order of ¾ to 1" in length. Thus, a brush cutting machine powered by an engine of small horsepower and driving a 12" blade may accommodate only three pairs of teeth on the blade. On the other hand, an 8" blade driven by an engine of large horsepower, may be able to accommodate six pairs of teeth.

With respect to the spacing between the cutter teeth of a pair, that is the left and right cutters of a pair, the closer such teeth are spaced peripherally the less chatter and drag will occur and the higher the cutting efficiency. However, from a practical standpoint, it is preferable that a trailing tooth of a pair be spaced from the leading tooth so as to provide a segmental portion of the disc periphery, indicated at 57, between such tooth The segmental portion 57 will protect the trailing tooth of a pair if a leading tooth is damaged or broken. The preferred spacing between individual cutter teeth of a pair is about 0.250 inch, but may vary between 0.150 to greater than one inch in some instances.

Preferably, means are provided on the blade to deflect the blade towards the central plane of the blade as the blade rotates into the kerf. Blades tend to wander, particularly blades of larger diameter using larger cutters, that is having greater than ⅜" spacing between rivet openings. This wandering of the blade makes it difficult to start into a cut since the blade will tend to walk up or down the face of the material being cut. The wandering of the blade will also cause the blade to cut a wider kerf, greatly reducing cutting efficiency.

In the embodiment of the invention illustrated in FIGS. 1–4, a deflecting means is embodied in the depth gauge 40. As will be seen in FIGS. 3 and 4, the shank portion of the depth gauge is reversely curved portion and outwardly from the plate 42 and thence back over the center line of the tooth wherein it forms the depth gauge top plate 44. As best shown in FIG. 4, the shank portion 42 is inclined outwardly from the forward edge of the tooth so as to provide an inclined planing surface. The slope of this surface should be between about 4° to 12°, preferably about 8°, with respect to the blade surfaces 14, 16. The trailing edge of the reversely curved depth gauge portion 60 should provide at least between about 0.020 to 0.035 inches clearance for the cutting edge 38 formed on the kerf sidewall cutting portion 32.

Figure 6:
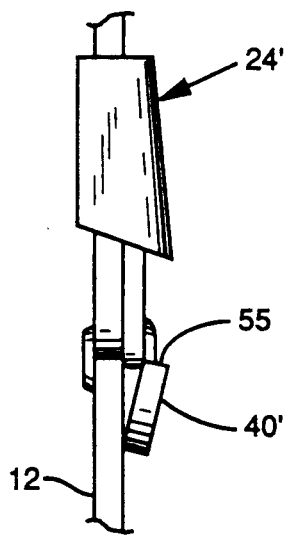
FIG. 6 is a top view of the cutter of FIG. 5.

While the configuration of the depth gauge described above is preferred, other configurations may be utilized. For example, a standard depth gauge such as shown in U.S. Pat. Nos. 2,508,784 and 2,622,634, or the more sloping depth gauge of U.S. Pat. No. 3,929,049 may be used. Referring to FIGS. 5 and 6, there is therein illustrated a left hand cutter tooth 24' having a depth gauge 40' thereon of the width of the sheet material from which the tooth is formed. While such depth gauge 40' may be co-planar with the flat plate portion 26' of the tooth, preferably the depth gauge is canted outwardly from its front to the trailing edge 55 thereof as best shown in FIG. 6 to provide a deflecting means to deflect the blade toward the central plane of the blade as it enters a kerf. Use of single width depth gauges will, however, give rise to increased kickback force, but because of the recessing of the teeth and their arrangement in widely spaced apart pairs, the kickback will be substantially less than for blades with evenly and closely spaced teeth.

Figure 7:
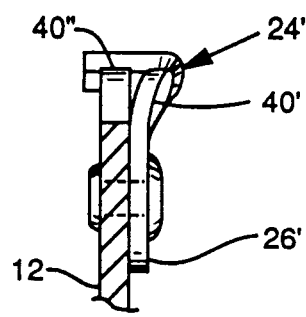
FIG. 7 is a front view of another arrangement of the cutter of FIGS. 5 and 6 showing a modification of the blade structure.
Figure 9:
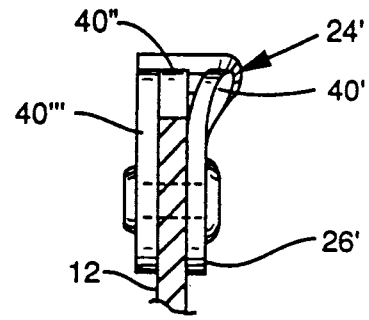
FIG. 9 is a front view of still another arrangement of the cutter of FIGS. 5 and 6 showing a modification of the blade and mounting of the cutter.
Figure 8:
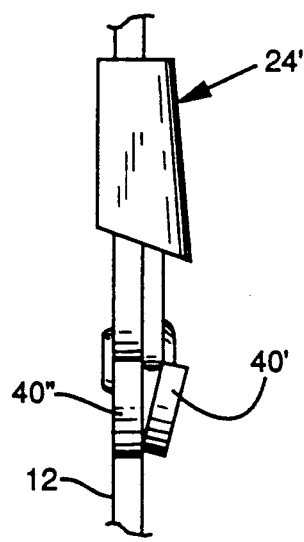
FIG. 8 is a top view of the arrangement of FIG. 7.
Figure 10:
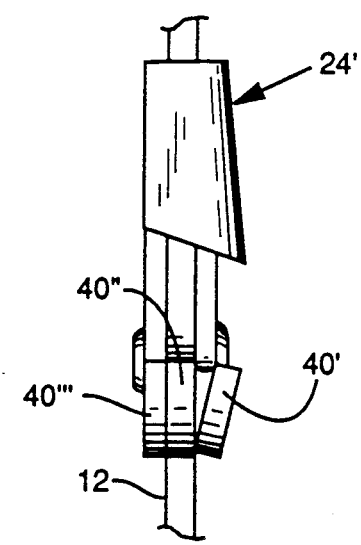
FIG. 10 is a top view of the arrangement of FIG. 9.

The width of the depth gauge can be effectively increased also by providing a ramp 40" on the periphery of the disc as shown in FIGS. 7 and 8 matching the ramp or slope of the cutter link depth gauge 40'. In addition, an opposing side plate 57 with a matching ramp 40"' can be positioned on the disc so that the depth gauge in effect is made up of three adjacent members as shown in FIGS. 9 and 10. In both of these embodiments, the depth gauge 40' on the cutter element is preferably canted outwardly as described in connection with FIGS. 5 and 6. Because of the greater width of the depth gauge surface provided by the double and triple ramps, they will have greater effectiveness in reducing kickback force than the single width depth gauge but will not be as satisfactory as the embodiment of FIGS. 1 to 4.

Alternatively, a deflecting means may be provided by wings 62, 64 on the disc 12 of right and left configuration, respectively, as shown in FIGS. 11 to 13, positioned in front of a pair of teeth 22', 24'. The wings 62, 64 are formed on the disc 12 immediately preceding each pair of teeth such as by forming a pair of L-shaped cuts 66, 68 to permit the wings 62, 64, respectively, to be bent outwardly from the blade. The teeth 22', 24' are provided with depth gauges 90 which in this instance comprise a planar shank 92 and an inclined top plate portion 94.

As indicated earlier, blades made in accordance with the described embodiments run more smoothly, have less tendency to kick back and cut more effectively than prior blades of which I am familiar.

Having illustrated and described a preferred embodiment of the invention and certain modifications thereof, it will become apparent to those of skill in the art that the invention permits further modification in arrangement and detail. I claim all such modifications as come within the purview of the appended claims.

I claim:

1. A brush cutting blade for a motor driven brush cutting machine, said blade comprising, a circular disc having opposite planar parallel side surfaces and a smooth generally continuous periphery, and a plurality of cutter teeth individually attached to the periphery of said disc, said teeth being of alternating left and right configuration and being mounted alternately on opposite sides of said disc, there being a plurality of pairs of said teeth, each of said teeth comprising a flat plate portion abutting one of said side surfaces of said disc, fastener means extending through each of said tooth plate portions and said disc rigidly to secure said teeth to said disc, each of said teeth having a single cutter element consisting of a side wall portion integral with said plate portion and an outer flange portion, said side wall portion being laterally offset from said plate portion, the amount of offset progressively decreasing from a forward end to a rearward end thereof, said flange portion extending from said side wall portion substantially at right angles to said disc side surfaces across the median plane of said disc, said flange portion being inclined downwardly at an angle of between seven and ten degrees with respect to a plane perpendicular to a radius of said disc intersecting a forward edge of said flange portion, a forward edge of said side wall portion and the forward edge of said flange portion of each tooth being formed with a beveled surface defining a cutting edge, and a depth gauge integral with a forward end portion of each tooth plate portion positioned forwardly of said cutter element to define a gullet therebetween, said depth gauge defining an upwardly facing flat surface sloping upwardly from a leading edge to a trailing edge at an angle of between twenty-five and thirty-five degrees with respect to a plane parallel to the axis of said disc and normal to a radius of the disc intersecting the trailing edge of said depth gauge, said depth gauge surface having a width of between 0.075 to 0.275 inch, the trailing edge of said depth gauge being spaced between 0.020 and 0.035 inch below the cutting edge of said flange portion, the periphery of said disc being cut away opposite each tooth from a point adjacent a rearward end of the said flange portion to the leading edge of said depth gauge portion, each tooth being mounted on said blade with the trailing edge of said depth gauge positioned between about 0.025 and 0.035 inch outwardly from the arc of the blade periphery and with a rearward top edge of said flange portion positioned substantially flush with the periphery of said blade, said pairs of teeth each comprising a right and a left hand tooth spaced apart circumferentially a distance no greater than about the length of a tooth, said pairs being spaced apart a distance equal to several times the length of a tooth.

2. A brush cutting blade, as set forth in claim 1, wherein said teeth of a pair are spaced apart between 0.150 and 0.687 inches.

3. A brush cutting blade, as set forth in claim 2, wherein said disc has a diameter of at least eight inches and said pairs of teeth are spaced apart a distance in excess of four inches.

4. A cutting blade, as set forth in claim 1, wherein said depth gauge has a width of 0.175 inch.

5. A cutting blade, as set forth in claim 1, wherein said depth gauge slopes at an angle of thirty degrees.

6. A cutting blade, as set forth in claim 1, wherein said flange portion slopes at an angle of seven degrees.

7. A cutting blade, as set forth in claim 1, wherein said cutter teeth are secured to said disc by rivets extending through said blade and teeth.

8. A brush cutting blade for a motor driven brush cutting machine;
said blade comprising a circular disc having a generally continuous periphery
a plurality of cutter elements on said blade adjacent the periphery thereof,
said cutter elements each having a kerf bottom cutting edge extending laterally across the central plane of said disc,
said cutter elements of each pair being in pairs one cutter element being of right hand configuration and the other cutter element of each pair being of left hand configuration,
the cutter elements of each pair being spaced closely together circumferentially,
said pairs being spaced apart circumferentially by a distance at least several times the spacing between the cutter elements of each pair.

9. A brush cutting blade, as set forth in claim 8, having a maximum of six pairs of cutter elements thereon.

10. A brush cutting blade, as set forth in claim 8, having three pairs of cutter elements thereon.

11. A brush cutting blade, as set forth in claim 10, wherein the cutter elements of each said pair are spaced apart no more than about 0.075 inch.

12. A brush cutting blade, as set forth in claim 8, having four pairs of cutter elements thereon.

13. A brush cutting blade, as set forth in claim 8, having five pairs of cutting elements thereon.

14. A brush cutting blade for a motor driven brush cutting machine,
said blade comprising a circular, disc having a generally continuous periphery and opposite flat sides,
a plurality of cutter teeth secured to the opposite flat sides of said disc adjacent the periphery thereof,
said cutter teeth being of alternate right and left configuration, and said cutter teeth each having means defining a cutting edge extending laterally of said blade on opposite sides thereof,
said teeth being secured in pairs, one tooth of each pair being of right hand configuration and the other tooth of each pair being of left hand configuration said teeth of each pair being spaced about the periphery, in closely adjacent relation to each other,
said pairs being spaced apart peripherally by an amount at least several times the spacing of the teeth of said pairs,
and means on said blade for engaging the sides of a kerf cut in a workpiece by said blade and deflecting said blade toward the central plane of said blade as the blade rotates through said kerf.

15. The blade, as set forth in claim 14, wherein said deflecting means comprises a wing formed by a portion of the blade adjacent its periphery bent outwardly from a side of the disc immediately preceding each said pair of cutter teeth, said wing sloping outwardly toward the next succeeding pair of teeth.

16. A blade, as set forth in claim 14, wherein said deflecting means comprises a pair of wings spaced immediately preceding each said pair of cutter teeth, each said wing being formed by a portion of the blade adjacent its periphery bent outwardly from one side of the disc immediately preceding each said pair of cutters, one of said wings of a pair being bent outwardly of one side of the blade and the other wing of a pair being bent outwardly from the other side of the blade, said wings sloping outwardly toward the next succeeding pair of teeth.

17. A blade, as set forth in claim 14, wherein said deflecting means comprises a plurality of depth gauges, one of said plurality of depth gauges being associated with each of said cutter teeth for limiting the depth of cut of said teeth,
each of said depth gauges including a portion extending outwardly from the side of said blade to which the cutter tooth is mounted,
said portion being inclined outwardly from said blade in a direction opposite the direction of rotation of said blade.

18. A brush cutting blade for a motor driven brush cutting machine, said blade comprising,
a circular disc having a smooth generally continuous periphery,
a plurality of cutter teeth of alternate right and left configuration fastened alternately in pairs to opposite sides of said disc, said teeth each comprising a flange portion extending across the blade and defining a leading cutting edge, said flange portions each sloping downwardly toward the periphery of said blade,
the cutter teeth of each pair being spaced closely together together circumferentially, said pairs being spaced apart circumferentially by a distance at least several times the spacing between the cutter teeth of each pair, each said tooth having an integral depth gauge positioned forwardly of said cutting edge, adjacent each said tooth with each said tooth fastened to said blade with a trailing edge of the flange portion thereof substantially flush with the periphery of said blade.

19. A brush cutting blade, as set forth in claim 18, wherein said depth gauges define a cutting clearance for said cutting edges of a predetermined amount and said depth gauges project beyond said periphery by an amount equal to the distance of said cutting edge beyond said periphery minus said clearance.

20. A brush cutting blade, as set forth in claim 18, wherein the depth gauge of each said tooth includes a portion defining a surface inclined outwardly from the side of the blade to which the tooth is fastened.

21. A brush cutting blade, as set forth in claim 20, wherein each said depth gauge comprises means defining an upwardly facing surface of at least about twice the width of said blade.

22. A brush cutting blade, as set forth in claim 18, wherein said blade is formed with a plurality of wings projecting outwardly from each side of said blade, there being a pair of such wings, immediately preceding each of said pair of teeth, the wings of each pair being on opposite sides of the blade, said wings sloping outwardly towards the succeeding pair of teeth.

23. A brush cutting blade as set forth in claims 18 or 20, said depth gauge having an upwardly facing flat surface sloping upwardly from a forward edge to a rearward edge, the arc of said disc periphery intersecting said flat surface.

* * * * *

UNITED STATES PATENT AND TRADEMARK OFFICE
CERTIFICATE OF CORRECTION

PATENT NO. : 4,989,489
DATED : February 5, 1991
INVENTOR(S) : J. Dana Pinney

It is certified that error appears in the above-identified patent and that said Letters Patent is hereby corrected as shown below:

Column 1, line 11, "field" should be --filed--.

Column 1, line 31, "859,554" should be --869,574--.

Column 3, line 24, "No. 2,622,634" should be --No. 2,622,636--.

Column 4, line 5, delete "edge".

Column 4, line 38, "move" should be --more--.

Column 5, line 8, after "tooth" insert --.-- (period).

Column 7, line 45, the ";" (semicolon) after "machine" should be a --,-- (comma).

Column 7, line 47, after "periphery" insert a --,-- (comma).

Column 7, line 53, after "pairs" insert a --,-- (comma).

Column 8, line 4, "cutting" should be --cutter--.

Column 8, line 7, after "circular" delete the --,-- (comma).

Column 8, line 12, delete "and" and insert therefor --each of-- after "teeth" delete "each".

Column 8, line 18, after "configuration" insert a --,-- (comma).

UNITED STATES PATENT AND TRADEMARK OFFICE
CERTIFICATE OF CORRECTION

PATENT NO. : 4,989,489

DATED : February 5, 1991

INVENTOR(S) : J. Dana Pinney

It is certified that error appears in the above-identified patent and that said Letters Patent is hereby corrected as shown below:

Column 8, line 19, after "periphery" delete the --,-- (comma).

Column 8, line 28, "The" should be --A--.

Column 8, line 68, delete "together" (first occurrence).

Column 9, line 5, after "edge" and before "adjacent" insert a beginning of a paragraph --the periphery of said blade being cut away--; and Column 10, line 7, "18" should be --20--.

Signed and Sealed this

Second Day of March, 1993

Attest:

STEPHEN G. KUNIN

Attesting Officer

Acting Commissioner of Patents and Trademarks